United States Patent [19]

Pearson

[11] 4,189,523
[45] Feb. 19, 1980

[54] SHEET METAL FASTENER ASSEMBLY AND METHOD OF FORMING THE SAME

[75] Inventor: Kenneth C. Pearson, Glenview, Ill.

[73] Assignee: Hartco Company, Lincolnwood, Ill.

[21] Appl. No.: 904,746

[22] Filed: May 11, 1978

[51] Int. Cl.² ............................................. A47C 31/02
[52] U.S. Cl. .................................. 428/571; 428/572;
    428/573; 428/574; 428/575; 5/259 R; 5/259 B;
    403/188
[58] Field of Search ............... 428/571; 572, 573, 574,
    428/575; 5/259 R, 259 B; 403/188

[56] References Cited
U.S. PATENT DOCUMENTS

| 2,597,343 | 5/1952 | Lang | 428/573 |
| 2,748,452 | 6/1956 | Pierce | 428/573 |
| 2,954,602 | 10/1960 | Derby | 428/572 |
| 4,102,586 | 7/1978 | Pearson et al. | 5/259 R |

Primary Examiner—Brooks H. Hunt
Attorney, Agent, or Firm—Edward R. Lowndes

[57] ABSTRACT

A flexible string of interconnected sheet metal clips of the type which are adapted to hold the end bars of a sinuous or zigzag cushion-supporting springs on the wooden frame of an article of furniture. The clips are disposed in side-by-side relationship and adjacent clips in the string are connected together by a thin flexible web, the thickness of which is reduced by a swaging operation, and which serves to maintain such clips slightly spaced apart. A method of producing such a string of clips which comprises initially fashioning a substantially rigid stick of clips wherein adjacent clips are disposed in contiguous edge-to-edge relationship with adjacent clips being held in their abutting relation by an a integral narrow but full thickness web, and subsequently swaging the webs to flatten the same and thus expand the area of the webs so as to spread adjacent clips apart and produce a narrow gap therebetween, the thus expanded webs serving, collectively, to create a string of clips in which adjacent clips are sufficiently spaced apart that no interference is afforded therebetween, thus enabling the string to be coiled for clip-feeding purposes in connection with a suitable clip-applying tool.

7 Claims, 7 Drawing Figures

U.S. Patent  Feb. 19, 1980  4,189,523
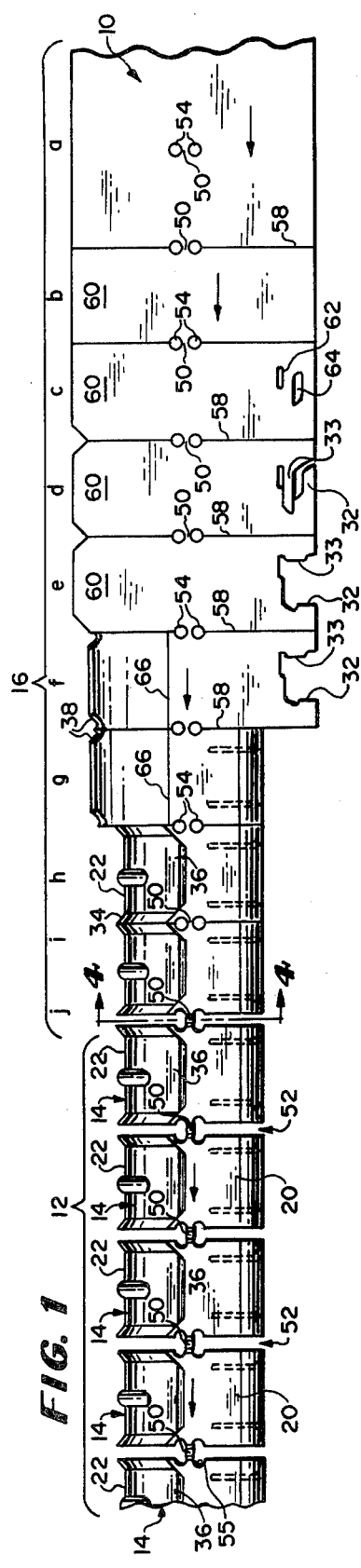
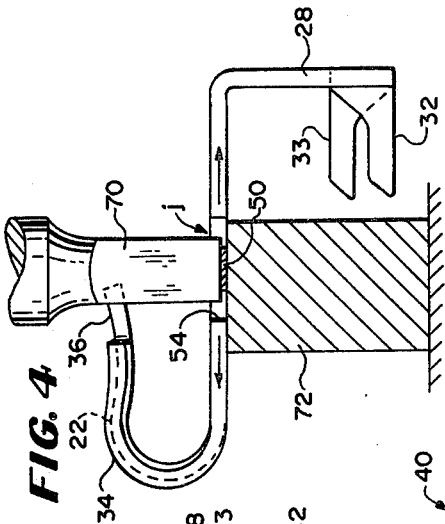
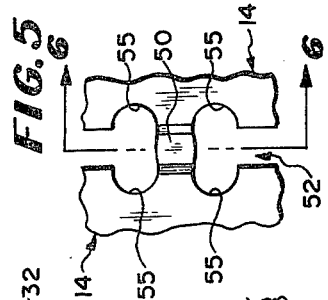
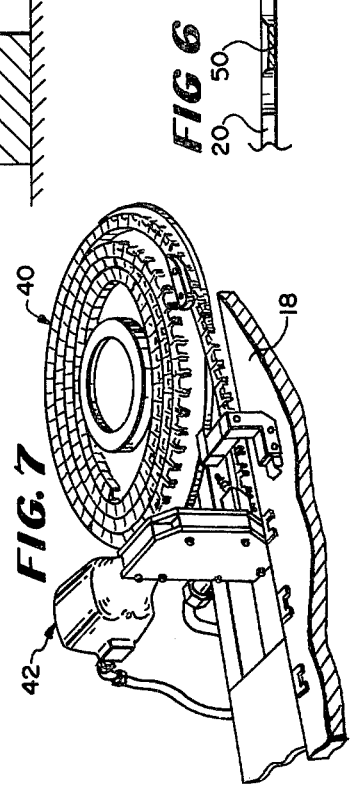
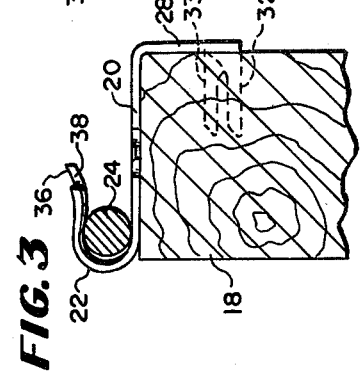
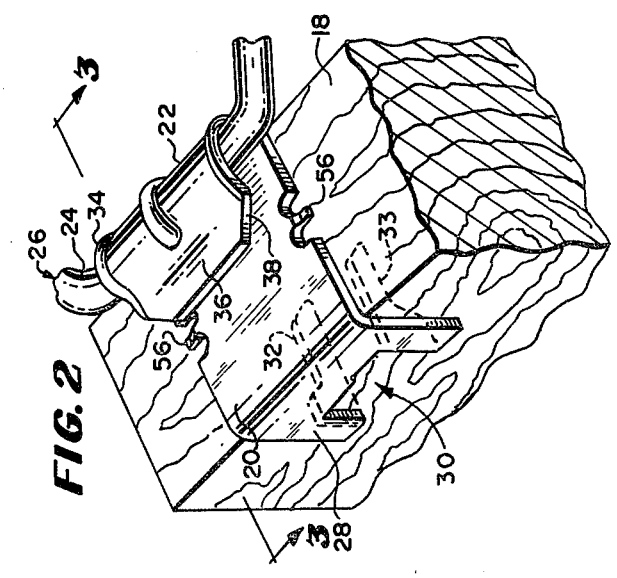

SHEET METAL FASTENER ASSEMBLY AND METHOD OF FORMING THE SAME

The present invention relates to sheet metal clips of the type which are applied to the wooden rails of furniture frames for anchoring the end bars of sinuous or zigzag cushion-supporting spring in position on such rails and it has particular reference to a flexible string of interconnected clips which is capable of being coiled and maintained in an out-of-the-way position for successive feeding of the leading clips in the string to a suitable clip-applying tool. The invention also pertains to a novel method, utilizing conventional punch press procedures, for producing such a string of clips on a continuous basis, yet in which the string that emerges from the punch press operation affords sufficient spacing between clips that the string may conveniently be coiled in an out-of-the-way position for feeding of the string to a suitable clip-applying tool by means of which the clips are applied to a wooden furniture rail.

The invention has been developed in connection with the production of a string of fastener clips of the general type which is shown and described in an allowed copending application, Ser. No. 810,202, filed on June 27, 1977 and entitled "Spring Fastener Clips for Wooden Furniture Rails" and over with the present clip assembly constitutes an improvement. Accordingly, for exemplary purposes only, it has been illustrated and described herein as being associated with such a string of fastener clips. It is to be distinctly understood however that the invention is applicable to other forms of fasteners such as staples or the like and, when so applied, the essential features of the invention are at all times preserved.

In the aforementioned copending application, there is disclosed a string of interconnected anchor clips which, more aptly, should be termed a stick of clips inasmuch as it is fairly rigid. Its rigidity is predicated upon the fact that adjacent clips in the series of clips are disposed in edge-to-edge contiguity and are connected together by one or more narrow webs which constitutes the sole means for holding the clips together. Such web is the result of an interruption in the transverse slit which divides adjacent clips from each other. Since the sheet metal from which the clips are formed possesses appreciable thickness and is relatively stiff, and since substantially contiguous hook portions project upwardly from the base of the clip, while contiguous leg portions project downwardly therefrom, it is apparent that a clip assembly of this nature possesses practically no flexibility in any direction and an attempt to coil or otherwise bend it will be opposed by the presence of tension in the web. Such an assembly or stick of clips is therefore suited for magazine feed to a clip-applying tool in rigid unit lengths of from twenty to thirty clips for example, but it is entirely unsuited for coiling in involute fashion to provide a source for feeding five hundred or more clips to a clip-applying tool.

Heretofore it has been common practice to obtain the necessary spacing between adjacent clips or other fasteners by notching the sheet metal strip and removing material between adjacent fasteners while leaving such fasteners connected together by one or more narrow webs. This increases the angle that can be attained between adjacent fasteners before the lateral projections contact each other. This notching procedure is however possessed of the distinct disadvantage that a considerable amount of scrap metal must be sacrificed during the punch press operation.

The present invention is designed to overcome the above-noted limitation that is attendant upon the constructions and use of present day clip or fastener assemblies of the type under consideration and, toward this end, the invention contemplates the provision of an assembly wherein a gap is established between adjacent clips and wherein a narrow web bridges such gap, the gap, instead of being created by the usual cutting or notching of metal from the strip stock, is produced by slitting the stock to establish the web, and then swaging the web in such a manner that its thickness is decreased while at the same time it is expanded radially in all directions with a major expansion taking place in the longitudinal direction of the strip. In so expanding or elongating, the web forces adjacent clips apart to create the gap without any loss of metal whatsoever. By reason of such swaging operation, the gaps which are created between adjacent clips are of sufficient magnitude or width that the string of clips may be coiled in involute fashion on a small initial radius.

The provision of a clip assembly such as has briefly been outlined above, as well as of a method of forming the assembly wherein swaging dies are caused to operate upon the webs to attain the stated advantages, constitute the principal objects of the present invention. Various other objects and advantages will become readily apparent as the nature of the invention is better understood.

In the accompanying single sheet of drawings forming a part of this specification, one exemplary embodiment of the invention has been shown.

In these drawings:

FIG. 1 is a fragmentary plan view of a length or strip of flat sheet metal clip-forming stock, illustrating in schematic fashion its passage through the working area of a punch press, and showing the nature of the various sequential punching, slitting, severing, bending, stamping and other operations which are performed upon the stock during its step-by-step passage through such working area in the production of an elongated flexible string of clips capable of being coiled in involute fashion for feeding to a clip-applying tool;

FIG. 2 is a perspective view of one of the clips which is produced by the punch press operation of FIG. 1, and showing the same operatively installed upon a furniture rail;

FIG. 3 is a sectional view taken substantially on the vertical plane indicated by the line 3—3 of FIG. 2 and in the direction of the arrows;

FIG. 4 is an enlarged sectional view taken on the line 4—4 of FIG. 1 but with the punch press swaging tool and anvil die in cooperating positions on the sheet metal strip in the performance of a swaging operation which constitutes one of the principal features of the invention;

FIG. 5 is an enlarged fragmentary detail plan view of the juncture region between a pair of adjacent clips in the string of clips, and illustrating specifically the nature of a swaged connecting web by means of which such clips are held together;

FIG. 6 is a sectional view taken on line 6—6 of FIG. 5; and

FIG. 7 is a fragmentary perspective view showing the flexible string of clips in a coiled condition and also showing its relation to a clip-applying tool by means of which clips that are severed from the coil are applied to a furniture rail.

Referring now to the drawings in detail, and in particular to FIG. 1, there is disclosed in this view an elongated ribbon-like strip 10 of flat sheet metal stock which is subjected to sequential operations as it is fed through a punch press and which emerges from the punch press in the form of a continuous flexible length or string 12 of interconnected spring fastener clips 14. The details of the punch press are not disclosed in FIG. 1 but the nature of the sequential operations which it performs on the metal strip stock 10 in producing the string of clips has been somewhat schematically illustrated, the range of these punch press operations being designated by the bracket labelled 16. The individual clips 14 form no part of the present invention and no claim is made herein to any novelty associated with the same. Rather the invention resides in the flexible string 12 of clips and particularly in the manner in which adjacent clips are connected together in slightly spaced apart relationship.

The clips 14 are of the type which are commonly used for securing the ends of elongated zigzag cushion-supporting springs to the marginal wooden frame members of an article of furniture so that the springs, which are arched and are highly resilient, span the opening of the frame and constitute a yielding support for the occupant. The details of one of the clips 14, as well as its application to a furniture rail 18 is shown in FIGS. 2 and 3. The particular clip selected for exemplary purposes herein constitutes the subject matter of the aforementioned application, Ser. No. 810,202 but it is to be distinctly understood that the present invention is applicable to other furniture clips of the same general type, as well as to a wide variety of fasteners which are susceptible to manufacture by punch press operations. For a full understanding of the nature of the exemplary clip 14 and its installation on a furniture rail such as the rail 18, reference may be had to such copending application. However, for purposes of discussion herein a brief description will suffice.

Accordingly, and with reference to FIGS. 2 and 3, the clip 14 involves in its general organization a flat base portion 20 which is seated upon the upwardly facing surface of the rail 18. The inner end of the base portion 20 (i.e. the end which faces the furniture frame opening) is provided with a curved reentrant or reverse bend 22 which establishes a hook portion for reception of the end bar 24 of a zigzag cushion-supporting spring 26. The outer end of the base portion 20 is provided with a downturned leg 28 which extends alongside the outer vertical face of the rail 18 and which is formed with a rectangular void or recess 30 having vertical side edges which are bent laterally so as to provide a pair of inwardly extending anchor prongs 32 and 33 which penetrate and are embedded in the wood of the rail 16 at slightly different elevations, thus maintaining the clip properly positioned on the rail. The edge regions of the reverse bend or hook portion 22 are flared as indicated at 34 to guard against cutting of the end bar 24 by the sharp edges of the clip. The distal end of the hook portion 22 is flared upwardly as indicated at 36, thus facilitating entry of the end bar 24 into the hook portion.

Application of the clip to the rail 16 is effected by forcibly driving the prongs 32 into the rail and this operation may be performed manually when applying the clip to a fully erected or completed article of furniture, or it may be performed automatically to a detached rail as shown in FIG. 7, in which case the string 12 of clips are coiled as indicated at 40, the leading end of the coil extending to a fixedly mounted pneumatic or other clip-applying tool 42 where a vertically movable impact plunger (not shown) engages the leading clip and drives the same bodily downwardly and thus forces the prongs 32 into the detached rail. Placement of the clip on the rail at the desired location is effected by periodically indexing the rail past the tool 42 and causing the latter to be actuated during each dwell period of the rail. The clip-applying tool 42, insofar as the plunger actuating mechanism is concerned, may be of the general type which is shown and described in U.S. Pat. No. 3,641,656, granted on Feb. 15, 1972 and entitled "Clip Applying and Clinching Tools" but the use of such tool is only indirectly related to the present invention. The disclosure of FIG. 7 herein is made solely to illustrate the fact that the string of clips 12 which is constructed by the punch press through the range of operations 16 is flexible at least to the extent that it may be coiled as indicated at 40 in FIG. 7.

Referring again to FIG. 1, and considering only the continuous string of clips 14 which emerges from the punch press operation as shown at the left hand side of this view, and which is formed from the sheet metal blank 10, each clip is joined to its next adjacent clip by a narrow connecting web 50 (see also FIG. 5) which constitutes the sole connection between the two clips. The web 50 serves to maintain the adjacent side edges of the clips in slightly spaced relationship so as to provide a narrow gap 52 between such clips. As will be described in greater detail subsequently when the nature of the punch press operations that take place in the punch press range 16 are set forth, such gap 52 is created during the last punch press operation by performing a swaging action on the web 50 as shown in FIG. 4, such operation resulting in compression of the web and serving to expand the web 50 and effectively space the adjacent clips apart. As will also become clear presently, a clean slitting between adjacent clips 14 may be enhanced prior to the swaging operation by punching two holes 54 in the strip 10 on opposite sides of the web 50, such holes subsequently being expanded or spread in a longitudinal direction so as to provide pairs of opposed clearance voids 55 during the swaging operation. These voids 55 appear in FIG. 2 as part of the tailings 56 which remain on the completed clip after the same has been severed from the strip 10.

Still referring to FIG. 1, the sequential punch press operations which are performed upon the strip 10 in the production of the clips 14 have been labelled from a to j inclusive, the last step, as previously indicated, comprising the aforementioned swaging operation which is performed on the web 50. All of these punch press operations, including the swaging operation, are straightforward operations and involve the use of conventional punching, slitting, bending, swaging and other dies, the construction of which are well within the knowledge, skill and capabilities of the average tool and die maker and therefore it is not deemed necessary to illustrate or enter into a discussion of such dies and their cooperation with one another. A schematic representation of the resultant work which they perform upon the strip 10 is considered to be adequate for disclosure purposes herein.

Referring now to the range 16 of punch press operations as shown in FIG. 1, the first operation a consists in punching the aforementioned holes 54 and thus establishing the web 50. During the next step b interrupted slits 58 are created and, at this time, the existence of such slits and holes establish a flat clip blank 60 of substantially rectangular configuration. Subsequently during the step c, two prong-shaping holes 62 and 64 are punched in the blank 60 while at the same time one corner of the blank is truncated. In step d slitting and bending operations are performed and these serve to define the outline of the two prongs 32 and 33, the prong 33 remaining in the plane of the blank 60 while the prong 32 becomes slightly bent out of such plane. Also during this step, the other corner of the blank 60 becomes truncated. In step e, bending operations are effected on the two prongs 32 and 33 so that they are caused to extend at right angles to the blank. In step f, a partial bending operation is effected upon the hook portion 22 of the clip along a bend axis 66. The performance of step g results in the establishing of the downturned leg 28 of the clip, while the step h serves to complete the reverse bend 22 and produce the finished hook portion including the flared portions 34 and 36. The step i is an idle indexing step, while the final step j consists in the effecting of the swaging operation which is performed upon the web 50 and which is illustrated in detail in FIGS. 4 and 5.

As previously stated, this final swaging step j constitutes one of the principal features of the present invention and it is effected by the use of an upper movable die 70 (FIG. 4) and a lower fixed anvil die 72. Upon descent of the upper die 70 into effective cooperation with the lower die 72, the resultant swaging of the web 50 takes place predominately in the direction of the grain of the metal (which invariably is in the longitudinal direction of the strip 10) and serves to spread the adjacent completely formed clip blanks apart as shown by the oppositely directed arrows in FIG. 4, thus creating the aforementioned gap 52 as shown in FIG. 5. It is to be noted at this point that, as best shown in FIG. 4, the provision of the holes 54 affords a clearance region for the opposite sides of the upper die 70 when the same descends and effects its swaging action on the web 50.

As previously stated, the principal feature of the present invention resides in the swaging of the web 50 in order to spread adjacent clips 14 apart and establish a gap such as the gap 52 therebetween without resorting to a notching operation and its attendant loss of scrap metal. It is of course apparent that the basic function of the swaged web 50 is substantially the same as that of a non-swaged web, the web in either case enabling adjacent clips to be inclined with respect to each other for string-coiling purposes as shown in FIG. 7. The wider the gap, the smaller is the potential attainable angle between adjacent clips before there is interference between adjacent lateral projections such as the hook portions 22 or the leg portions 30, depending upon which direction the clip assembly is coiled. The principal advantage therefore of swaging the web instead of creating it by a notching operation is the elimination of scrap metal.

A secondary advantage which is afforded by swaging the web 50 is predicated upon the fact that the swaging operation automatically reduces the thickness of the web and insures its rupture at the time that the leading clip is struck from the string of clips. Heretofore, in order to weaken the web, it has been the practice to perform a separate web weakening operation which results in the provision of a shallow transverse groove in the medial region of the web, such groove establishing a "tear-line" that facilitates separation of the leading clip in the string from its adjacent clip. According to the present invention, the descent of the swaging die upon the web not only spreads adjacent clips apart and avoids notching with its consequent loss of metal, but it also automatically attains a thin medial tear area without necessitating a special or additional punch press operation.

It has been previously stated that the principles of the present invention are applicable not only to furniture clips on the character illustrated and described herein, but are also applicable to other forms of fasteners such as staples or the like. Therefore, in the appended claims, it is intended that the term "clip" or its derivatives, wherever used, shall be construed as being inclusive of a wide variety of fastening devices which, when produced by a punch press operation, may be coiled for tool-feeding purposes or to conserve space for storage or packaging.

Fom the above description it is believed that the nature and many advantages of the present string of clips and its method of manufacture will become clear without further discussion. The invention is not to be limited to the exact arrangement of parts shown in the accompanying drawings or described in this specification as various changes in the details of construction may be resorted to without departing from the spirit of the invention. For example, although adjacent clips 14 in the string of clips 12 are shown as being connected together by a single web 50, it is within the purview of the invention to employ two or more webs if desired, it being understood that all of the webs will be swaged for clip-spreading purposes. Furthermore, in the manufacture of the clip assemblies, the nature of the various punch press operations illustrated in FIG. 1 at a, b, c, d, etc. may be varied in accordance with acceptable punch press operations but, among these operations, provision will be made for creating a web between adjacent clips by a swaging operation to attain the advantages set forth herein. Still further, the swaging operation described in connection with the punch press step show at j in FIG. 1 is not necessarily performed as the last punch press operation. If desired, it may be effected at any appropriate time after the two clearance holes 54 have been punched in the strip 10 so that the clip blanks will be spread apart either before or after they have been fashioned into clips 10. In either event, the clips are fashioned in situ on the strip so that they emerge from the punch press operation as completed clips ready for impact striking from the assembly during clip application to the rail 18. Therefore, only insofar as the invention has been particularly pointed out in the accompanying claims is the same to be limited.

Having thus described my invention, what I claim and desire to secure by Letters Patent is:

1. An elongated unitary assembly of sheet metal clips embodying a series of identical clips disposed in side-by-side relationship with the side edges of each pair of adjacent clips in the series opposing each other in slightly spaced apart relationship so as to provide a gap between adjacent clips and a narrow longitudinally expanded deformed reduced thickness web bridging the gap and serving to maintain such adjacent clips in their spaced apart relationship, said webs, collectively, rendering the assembly flexible for coiling in involute fashion by reason of their reduced thickness.

2. An assembly of clips as set forth in claim 1, wherein the clips are of the upholstery spring anchoring type, and each clip includes a flat base portion designed for positioning on the top surface of a wooden furniture rail, and a downturned leg designed for face-to-face engagement with the outer side of the rail and having anchor prongs formed thereon for embedment in the rail.

3. A unitary sheet metal clip assembly formed by a punch press operation from an elongated sheet metal strip, said assembly embodying a series of identical clips disposed in side-by-side relationship with the side edges of adjacent clips opposing each other and defining therebetween narrow gaps, and a narrow compressed and thus longitudinally elongated flexible web of reduced thickness extending between the side edges of each pair of adjacent clips said webs, when considered collectively serving to maintain such clips in their spaced apart relationship.

4. A unitary sheet metal clip assembly as set forth in claim 3, wherein the clips are of the upholstery spring anchoring type and each clip includes a flat base portion designed for positioning on the top surface of a wooden furniture rail, and a downturned leg designed for face-to-face engagement with the outer side of said rail and having anchor prongs formed thereon for embedment in the rail, and wherein the webs extend between the medial regions of the opposed edges of said base portions.

5. A unitary sheet metal clip assembly as set forth in claim 3, wherein opposed clearance voids are formed in each gap on opposite sides of its associated web.

6. The method of forming a unitary flexible assembly of clips from a longitudinally grained elongated sheet metal strip, said method including the steps of subjecting said strip to interrupted linearly straight slitting operations which divide the strip into a series of contiguous clip blanks having at least one narrow unslitted connecting portion therebetween, fashioning the clips in situ from the blanks and thereafter deforming the unslitted connecting portions, thereby causing longitudinal elongation thereof so as to spread adjacent fashioned clips apart and establish a narrow gap therebetween.

7. The method of forming an integral flexible assembly of clips as set forth in claim 6 including, additionally, the step of forming a pair of small transversely aligned clearance voids in each blank on opposite sides of its respective unslitted portion.

* * * * *